(12) United States Patent
Estrella Chavez et al.

(10) Patent No.: US 9,125,167 B1
(45) Date of Patent: Sep. 1, 2015

(54) SYSTEM AND METHOD OF INCREASING PAGING ACCURACY

(71) Applicant: Sprint Spectrum LP, Overland Park, KS (US)

(72) Inventors: Diego Estrella Chavez, Herndon, VA (US); Ramesh Kalathur, Fairfax, VA (US); Moshe Stoler, Gaithersburg, MD (US)

(73) Assignee: Sprint Spectrum L.P., Overland Park, KS (US)

( * ) Notice: Subject to any disclaimer, the term of this patent is extended or adjusted under 35 U.S.C. 154(b) by 83 days.

(21) Appl. No.: 13/859,533

(22) Filed: Apr. 9, 2013

(51) Int. Cl.
*H04W 68/00* (2009.01)

(52) U.S. Cl.
CPC ...................................... *H04W 68/00* (2013.01)

(58) Field of Classification Search
CPC ..... H04W 68/00; H04W 68/06; H04W 68/08; H04W 68/12; H04W 8/04; H04W 8/06; H04W 88/06; H04W 4/02
USPC ................ 455/458, 422.1, 426.1, 432.1, 433, 455/435.1
See application file for complete search history.

(56) References Cited

U.S. PATENT DOCUMENTS

| | | | |
|---|---|---|---|
| 5,787,355 A * | 7/1998 | Bannister et al. | 455/458 |
| 5,835,860 A * | 11/1998 | Diachina | 455/458 |
| 7,894,831 B2 * | 2/2011 | Ryu et al. | 455/458 |
| 2008/0014969 A1 * | 1/2008 | Laroia et al. | 455/458 |
| 2008/0293437 A1 * | 11/2008 | Ranganathan et al. | 455/458 |
| 2009/0325608 A1 * | 12/2009 | Cheng et al. | 455/458 |
| 2011/0021216 A1 | 1/2011 | Pudney et al. | |
| 2013/0324170 A1 * | 12/2013 | Watfa | 455/466 |
| 2014/0106792 A1 * | 4/2014 | Bienas et al. | 455/458 |

* cited by examiner

*Primary Examiner* — Temica M Beamer

(57) ABSTRACT

A system and method of paging a wireless device in a communication network is provided. A paging request from a first network for a first wireless device can be received at a paging node in communication with a first network and a second network. A paging message for the first wireless device can be generated at the paging node based on the paging request. The paging message can further comprise an identifier of the first network. The paging message can be broadcast to a plurality of wireless device, the plurality of wireless devices comprising the first wireless device and at least one second wireless device associated with the second network. A paging response can be received from the first wireless device based on the paging message.

20 Claims, 5 Drawing Sheets

SYSTEM AND METHOD OF INCREASING PAGING ACCURACY

TECHNICAL BACKGROUND

A wireless communication network can include a plurality of access points or access nodes. An access node can be controlled by a single network operator or shared by two or more different network operators. When an access node is shared by two or more different network operators, a wireless device associated with a first network operator can receive signals from the access node that are initiated over the network of the second network operator and intended for a wireless device associated with the second network operator.

OVERVIEW

A system and method of paging a wireless device in a communication network is provided. A paging request from a first network for a first wireless device can be received at a paging node in communication with a first network and a second network. A paging message for the first wireless device can be generated at the paging node based on the paging request. The paging message can further comprise an identifier of the first network. The paging message can be broadcast to a plurality of wireless devices, the plurality of wireless devices comprising the first wireless device and at least one second wireless device associated with the second network. A paging response can be received from the first wireless device based on the paging message.

DETAILED DESCRIPTION

Figure 1:
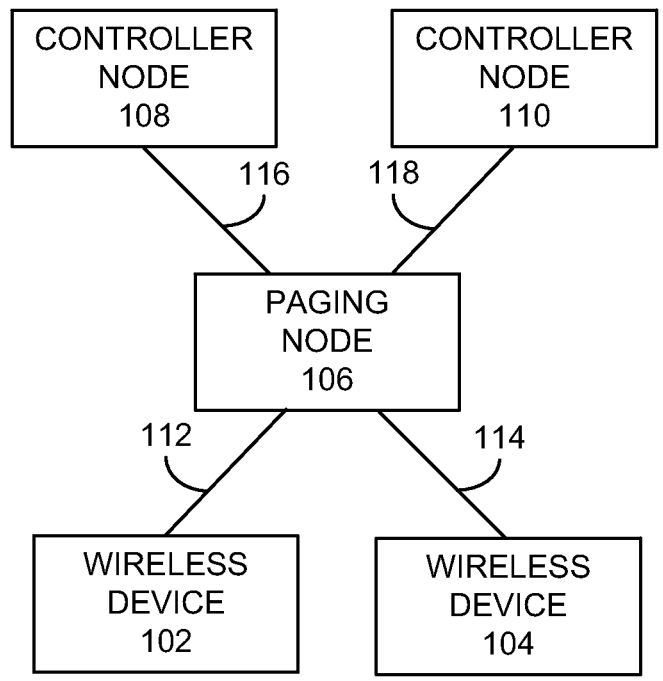
FIG. 1 illustrates an exemplary communication system to send paging messages to a wireless device.

FIG. 1 illustrates an exemplary communication system 100 to send paging messages. Communication system 100 comprises a first wireless device associated with a first network operator 102, a second wireless device associated with a second network operator 104, a paging node 106, a controller node associated with a first network operator 108, and a controller node associated with a second network operator 110. Other network elements may be present in the communication system 100 to facilitate communication but are omitted for clarity, such as gateways, routers, mobile switching centers, and location registers such as a home location register or visitor location register.

Wireless devices 102, 104 can be any device configured to communicate over communication system 100 using a wireless interface. For example, wireless devices 102, 104 can include a cell phone, a smart phone, a computing platform such as a laptop, palmtop, or a tablet, a personal digital assistant, or an internet access device, and combinations thereof.

Wireless devices 102, 104 are in communication with paging node 106 through communication links 112, 114. Links 112, 114 can use various communication media, such as air, space, metal, optical fiber, or some other signal propagation path—including combinations thereof. Communication links 112, 114 may comprise many different signals sharing the same link. Communication links 112, 114 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 102, 104 and paging node 106 could share the same representative wireless links 112, 114, but be transferred over different communication sessions, frequencies, timeslots, packets, ports, sockets, logical transport links, or in different directions—including combinations thereof.

Paging node 106 can be any network node configured to transmit paging messages to wireless devices 102, 104. Paging node 106 can be further configured as an access node to provide a communication interface between controller nodes 108, 110 and wireless devices 102, 104. For example, paging node 106 can be configured to include a base transceiver station, a radio base station, an eNodeB device, or an enhanced eNodeB device. When paging node 106 is configured as an access node, paging node 106 can include various elements such as a transceiver, power amplifier, combiner, duplexer, antenna, and control function devices. The paging node 106 can have various functions. For example, paging node 106 can provide mobility management, hand off provisioning and control, radio resource management, quality of service enforcement, session management, as well as other functions. Alternatively, paging node 106 can be a separate device from a node that provides communication access to the communication system 100.

Paging node 106 is in communication with the controller node associated with the first network operator 108 through communication link 116 and with the controller node associated with the second network operator 110 through communication link 118. Communication links 116, 118 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Links 116, 118 can be a direct link or might include various equipment, intermediate components, systems, and networks. Links 116, 118 can include multiple signals operating in a single pathway in a similar manner as wireless links 112, 114.

A network operator can be a communications provider that provides access to a network where communications are transmitted over the network. Typically, a network operator owns and operates the nodes within the network. However, a network operator may enter into relationships with other network operators to share resources such as frequency bands, network environments, etc. For example, multiple network providers may operate in a multi-operator core network environment, and may enter into agreements to share frequency bands or other network resources. Sharing agreements may be limited in scope, and network providers may share resources of the network while not sharing other resources of the network. For example, one network provider may share one frequency band with a second network provider while not sharing resources of another frequency band.

Although wireless devices 102, 104 are illustrated in FIG. 1 as being in communication with a single paging node 106, wireless devices 102, 104 can be in communication with more than one paging node. The plurality of paging nodes can be associated with different networks, for example, supporting different voice call protocols and/or different types of voice calls. For example, a first network can support packet switched telephone network (PSTN) calls and a second network can support voice over internet protocol (VoIP) calls. The plurality of paging nodes can also comprise a variety of devices, for example, a first paging node can be a base station of a wireless communication network, and a second paging node can be a wired or wireless access point of a data network. Other examples and combinations are also possible.

Controller node 108 can be a network element associated with a first network operator and controller node 110 can be a network element associated with a second network operator different from the first network operator. Controller nodes 108, 110 can be any element configured to communicate information over a network or control communication of the information over the network. Controller nodes 108, 110 can be a standalone computing device, computing system, or network component, and can be accessible, for example, by a wired or wireless connection, or through an indirect connection such as through a computer network or communication network. For example, controller nodes 108, 110 can include a mobility management entity (MME), a serving gateway (SGW), a public data network gateway (PGW), a Home Subscriber Server (HSS), a Policy Control and Charging Rules Function (PCRF), etc. One of ordinary skill in the art would recognize that controller nodes 108, 110 are not limited to any specific technology architecture, such as Long Term Evolution (LTE) and can be used with any network architecture.

Controller nodes 108, 110 can comprise a processor and associated circuitry to execute or direct the execution of computer-readable instructions to obtain information. Controller nodes 108, 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control nodes 108, 110 can receive instructions and other input at a user interface.

Wireless devices 102, 104 can operate in various states such as active state and idle state. During active states, wireless devices 102, 104 can actively transmit and/or receive information from the network, such as phone calls and/or data transfer. When wireless devices 102, 104 enter into a lower power state, such as an idle mode or sleep mode, wireless devices 102, 104 can discontinue constant communication with paging node 106. Communication system 100 can maintain a record of the last known location of the wireless devices 102, 104 in order to route paging messages to the wireless devices 102, 104. A paging message can be any message that indicates that the network is attempting to re-establish communications. For example, a paging message can be indicative of information available to be transmitted to the wireless device 102, 104 such as a voice mail message or an email message. The paging message can be initiated by the network sending a paging request to the paging node 106 before the wireless device 102, 104 can re-establish a communication session with the paging node 106. Wireless devices 102, 104 can respond to a paging message by sending a paging response message to the paging node 106.

In operation, controller node 108 associated with a first network operator can generate a paging request and send the paging request to paging node 106, where paging node 106 is in communication with network nodes associated with the first network operator and a second network operator. Paging node 106 can generate a paging message based on the paging request. The paging message can include a network identifier associated with the first network. For example, the network identifier can include a globally unique temporary identifier (GUTI) or a public land mobile network identifier (PLMN-ID) in conjunction with a S-temporary mobile subscriber identifier (S-TMSI). The paging message can be broadcast to a plurality of wireless devices associated with paging node 106, where the plurality of wireless devices includes at least one wireless device associated with the first network operator and at least one wireless device associated with the second network operator. The first wireless device 102 can receive the paging message, identify that first wireless device 102 was the intended device to receive the paging message, and send a paging response to the paging node 106 to initiate establishing a communication session.

After a communication session is established, wireless device 102 can communicate information over a network using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

The paging message including a network identifier is different from a paging message in a conventional multiple operator communication network, because a paging message of a multiple operator communication network can include a wireless device paging identifier that can be the same for a wireless device associated with a first network operator and a wireless device associated with a second network operator. For example, when the first network operator and the second network operator have the same controller node information and/or when the S-TMSI is equal for a wireless device associated with the first network operator and a wireless device associated with the second network operator. Therefore, when a paging message in a conventional multiple operator communication networks is sent, both the wireless device associated with the first network operator and the wireless device associated with the second network operator can receive the paging message and initiate re-establishing a communication session. Since the paging message in conventional networks is only intended for one wireless device, excess network resources can be consumed while diminishing a user's experience. For example, the wireless device not intended to receive the paging message unnecessarily consumes battery power needed to initiate the network connection, the network throughput is effected by an increase in response message transmission needed for both wireless devices to attempt to initiate re-connection, and the network can receive a false paging response from the unintended wireless device causing additional processing and messaging resources.

Figure 2:
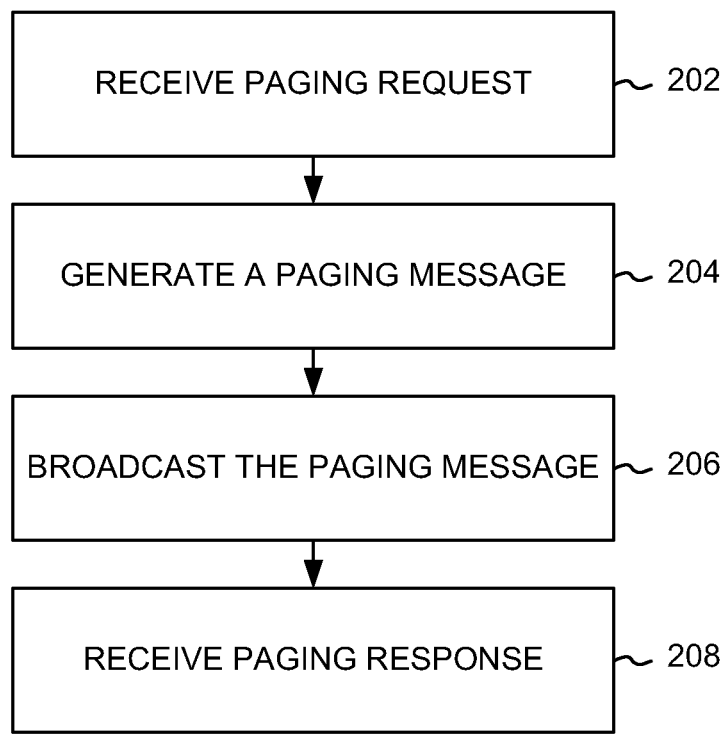
FIG. 2 illustrates an exemplary method of sending paging messages to a wireless device.

FIG. 2 illustrates a flow chart of an exemplary method of sending a paging message in a communication system. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A controller node associated with a first network operator 108 can send a paging request message to a paging node 106.

For example, controller node 108 can generate the paging request message when a wireless device 102 associated with the first network operator is in an idle state and information is available to be transmitted to the wireless device 102.

The paging node 106 can receive the paging request message at 202. The paging request message can include network information such that paging node 106 can identify the network in which the paging request message originated. This network information can be a network identifier or information that can be used to generate a network identifier. For example, the paging request message can include a GUTI and/or a PLMN-ID and S-TMSI based on the paging request received from controller node 108. Alternatively, paging node 106 can generate the network identifier by determining the network associated with the controller node that sent the paging request message.

At 204, paging node 106 can generate a paging message based on the received paging request message. For example, the paging node 106 can determine which network initiated the paging request. The generated paging message can include a network identifier. For instance, a GUTI and/or a PLMN-ID and S-TMSI can be used as a network identifier. Alternatively, other information can be used as a network identifier such that the paging message can be identified as being associated with one particular network. The paging message can also include any other information used to indicate that a network is attempting to re-establish communications with the intended wireless device.

Paging node 106 can broadcast the paging message at 206. For example, a plurality of wireless devices associated with paging node 106 can receive the paging message. The plurality of wireless devices can include at least one wireless device associated with the first network operator and at least one wireless device associated with the second network operator such that paging node 106.

All wireless devices that receive the paging message can determine whether it is the intended recipient of the paging message and send a paging response message. For example, when wireless device 102 is the intended recipient, wireless device 102 can generate a paging response message to send to the paging node 106. At 208, paging node 106 can receive the paging response message from the intended wireless device. A communication session can be initiated after the paging response message is received, such that the information available at the network can be transmitted to wireless device 102.

Controller node 110 and wireless device 104 associated with the second network can also send and/or receive paging requests, paging messages, paging responses, etc. via paging node 106 in a manner similar to that described above with respect to controller node 108 and wireless device 102.

Figure 3:
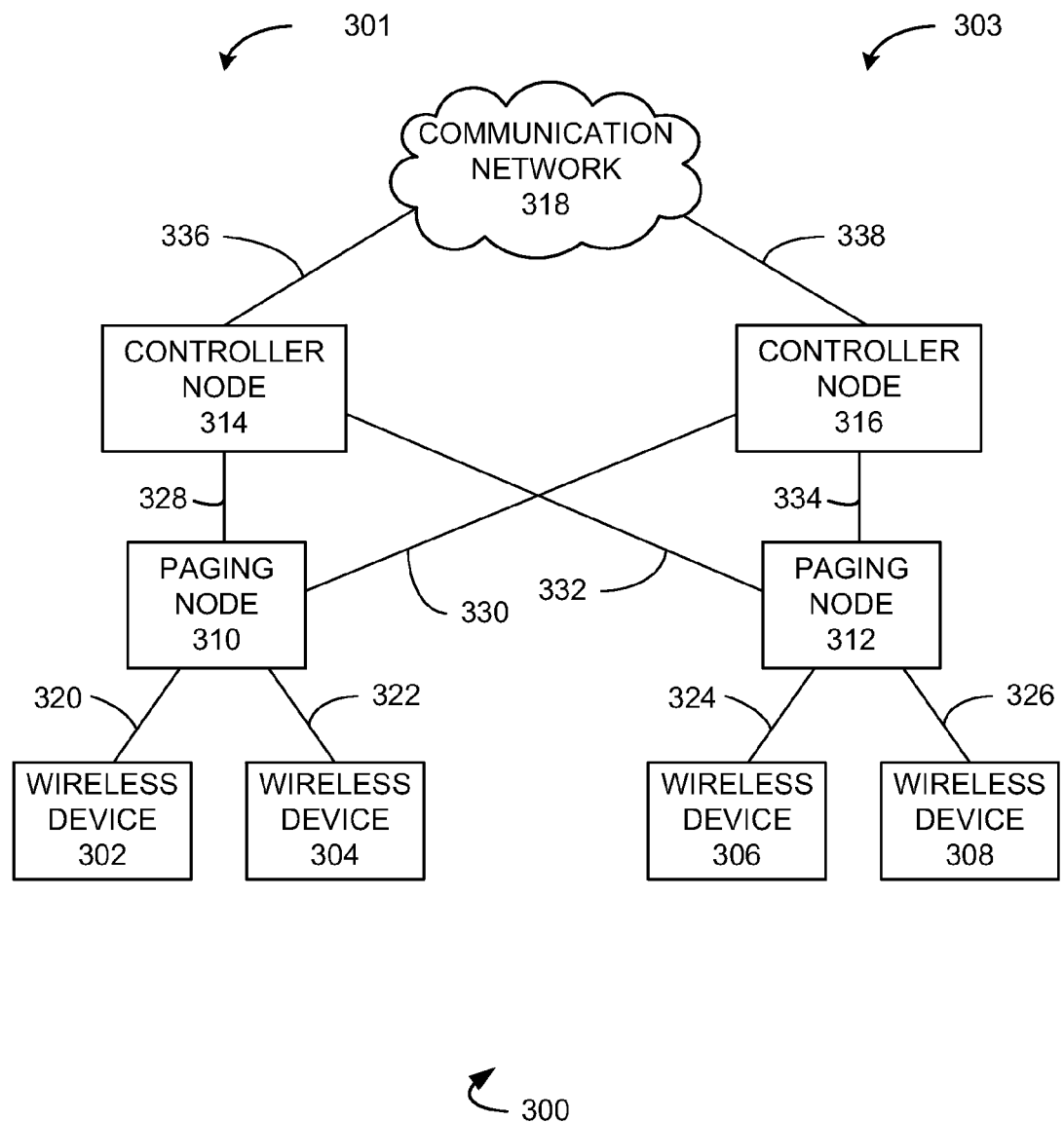
FIG. 3 illustrates another exemplary communication system to send paging messages to a wireless device.

FIG. 3 illustrates another exemplary communication system 300 to send paging messages. Communication system 300 comprises a first wireless device associated with a first network operator 302, a second wireless device associated with a second network operator 304, a third wireless device associated with the first network operator 306, a fourth wireless device associated with the second network operator 308, a first paging node 310, a second paging node 312, a controller node associated with the first network operator 314, a controller node associated with the second network operator 316, and a communication network 318. Other network elements may be present in the communication system 300 to facilitate communication but are omitted for clarity, such as gateways, routers, mobile switching centers, and location registers such as a home location register or visitor location register.

Wireless devices 302, 304, 306, 308 can be any device configured to communicate over communication system 300 using a wireless interface. For example, wireless devices 302, 304, 306, 308 can include a cell phone, a smart phone, a computing platform such as a laptop, palmtop, or a tablet, a personal digital assistant, or an internet access device, and combinations thereof.

Wireless devices 302, 304, 306, 308 are in communication with paging nodes 310, 312 through communication links 320, 322, 324, 326. Links 320, 322, 324, 326 can use various communication media, such as air, space, metal, optical fiber, or some other signal propagation path—including combinations thereof. Communication links 320, 322, 324, 326 may comprise many different signals sharing the same link. Communication links 320, 322, 324, 326 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless devices 302, 304, 306, 308 and paging nodes 310, 312 could share the same representative wireless links 320, 322, 324, 326, but be transferred over different communication sessions, frequencies, timeslots, packets, ports, sockets, logical transport links, or in different directions—including combinations thereof.

Paging nodes 310, 312 can be any network node configured to transmit paging messages to wireless devices 302, 304, 306, 308. Paging nodes 310, 312 can be further configured as an access node to provide a communication interface between controller nodes 314, 316 and wireless devices 302, 304, 306, 308. For example, paging nodes 310, 312 can be configured to include a base transceiver station, a radio base station, an eNodeB device, or an enhanced eNodeB device. When paging nodes 310, 312 are configured as an access node, paging nodes 310, 312 can include various elements such as a transceiver, power amplifier, combiner, duplexer, antenna, and control function devices. The paging nodes 310, 312 can have various functions. For example, paging nodes 310, 312 can provide mobility management, hand off provisioning and control, radio resource management, quality of service enforcement, session management, as well as other functions. In addition, paging nodes 310, 312 can operate using a shared spectrum associated with the first network operator and the second network operator or the paging nodes 310, 312 can operate using only one spectrum associated with the first network operator or the second network operator. Alternatively, paging nodes 310, 312 can be separate devices from the nodes that provide communication access to the communication system 300.

Paging node 310 is in communication with the controller node associated with the first network operator 314 through communication link 328 and with the controller node associated with the second network operator 316 through communication link 330. Paging node 312 is in communication with controller node 314 through communication link 332 and with controller node 316 through communication link 334. In addition, while not illustrated in FIG. 3, paging node 310 can be in communication with paging node 316 through an additional communication link.

A network operator can be a communications provider that provides access to a network where communications are transmitted over the network. Typically, a network operator owns and operates the nodes within the network. However, a network operator may enter into relationships with other network operators to share resources such as frequency bands, network environments, etc. For example, multiple network providers may operate in a multi-operator core network environment, and may enter into agreements to share frequency bands or other network resources. Sharing agreements may be limited in scope, and network providers may share resources of the network while not sharing other resources of the network. For example, one network provider may share one frequency band with a second network provider while not sharing resources of another frequency band.

Although wireless devices 302, 304, 306, 308 are illustrated in FIG. 3 as being in communication with a single paging node 310, 312, respectively, wireless devices 302, 304, 306, 308 can be in communication with more than one paging node. The plurality of paging nodes can be associated with different networks, for example, supporting different voice call protocols and/or different types of voice calls. For example, a first network can support packet switched telephone network (PSTN) calls and a second network can support voice over internet protocol (VoIP) calls. The plurality of paging nodes can also comprise a variety of devices, for example, a first paging node can be a base station of a wireless communication network, and a second paging node can be a wired or wireless access point of a data network. Other examples and combinations are also possible.

Controller node 314 can be a network element associated with a first network operator and controller node 316 can be a network element associated with a second network operator different from the first network operator. Controller node 314 can be in communication with the communication network 318 through communication link 336 and controller node 316 can be in communication with communication network 318 through communication link 338.

Communication links 328, 330, 332, 334, 336, 338 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Links 328, 330, 332, 334, 336, 338 can be a direct link or might include various equipment, intermediate components, systems, and networks. Links 328, 330, 332, 334, 336, 338 can include multiple signals operating in a single pathway in a similar manner as wireless links 320, 322, 324, 326.

Controller nodes 314, 316 can be any element configured to communicate information over a network or control communication of the information over the network. Controller nodes 314, 316 can be a standalone computing device, computing system, or network component, and can be accessible, for example, by a wired or wireless connection, or through an indirect connection such as through a computer network or communication network. For example, controller nodes 314, 316 can include a mobility management entity (MME), a serving gateway (SGW), a public data network gateway (PGW), a Home Subscriber Server (HSS), a Policy Control and Charging Rules Function (PCRF), etc. One of ordinary skill in the art would recognize that controller nodes 314, 316 are not limited to any specific technology architecture, such as Long Term Evolution (LTE) and can be used with any network architecture.

Controller nodes 314, 316 can comprise a processor and associated circuitry to execute or direct the execution of computer-readable instructions to obtain information. Controller nodes 314, 316 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control nodes 314, 316 can receive instructions and other input at a user interface.

Communication network 318 can be any type of network or internetwork. Network 318 may comprise a computer, a network, or a collection of computers and networks that couple, link, or otherwise operatively provide wireless devices 302, 304, 306, 308 with communication service. It should be understood that network 318 may comprise secondary data networks. For example, network 318 may include a backhaul network, a local network, a long distance network, a packet network, or any combination thereof, as well as other types of networks. Network 318 may be or include an access service network (ASN), an access service network gateway (ASN-GW), wireless local access network access gateway (WAG), packet data gateway (PDG), mobile switching center (MSC) and packet data serving node (PDSN).

Wireless devices 302, 304, 306, 308 can operate in various states such as active state and idle state. During active states, wireless devices 302, 304, 306, 308 can actively transmit and/or receive information from the network, such as phone calls and data transfer. When wireless devices 302, 304, 306, 308 enter into a lower power state, such as an idle mode or sleep mode, wireless devices 302, 304, 306, 308 can discontinue constant communication with paging nodes 310, 312. Communication system 300 can maintain a record of the last known location of the wireless devices 302, 304, 306, 308 in order to route paging messages to the wireless devices 302, 304, 306, 308. A paging message can be any message that indicates that the network is attempting to re-establish communications. For example, a paging message can be indicative of information available to be transmitted to the wireless devices 302, 304, 306, 308 such as a voice mail message or an email message. The paging message can be initiated by the network sending a paging request to the paging nodes 310, 312. Wireless devices 302, 304, 306, 308 can respond to a paging message by sending a paging response message to the paging node 106.

In operation, a controller node associated with a first network operator, can generate a paging request and send the paging request to paging node 310 and/or paging node 312 based on an intended wireless device associated with the first network. Paging node 310 and/or 312 can identify whether the intended wireless device is connected to the paging node. For example, when paging node 310 identifies that wireless device 302 is the intended wireless device, paging node 310 can generate a paging message based on the paging request. When paging node 312 identifies that wireless device 306 is the intended wireless device, paging node 312 can generate the paging message. Alternatively, paging nodes 310 and 312 can both generate and/or send the paging message. The paging message can include a network identifier associated with the network it is sent from, in this example the first network. For instance, the network identifier can include a globally unique temporary identifier (GUTI) or a public land mobile network identifier (PLMN-ID) in conjunction with a S-temporary mobile subscriber identifier (S-TMSI). The paging message can be broadcast to a plurality of wireless devices associated with paging node 310 and/or 312, where the plurality of wireless devices includes at least one wireless device associated with the first network operator and at least one wireless device associated with the second network operator. The intended wireless device can receive the paging message, identify that the paging message was intended for the wireless device, and send a paging response to paging node 310 or paging node 312 to initiate establishing a communication session.

Likewise, the controller node associated with the second network operator 316 can generate a paging request and send the paging request to paging node 310 and/or paging node 312 based on an intended wireless device associated with the second network. Paging node 310 and/or 312 can identify whether the intended wireless device is connected to the paging node. For example, when paging node 310 identifies that wireless device 304 is the intended wireless device, paging node 310 generates a paging message based on the paging request. When paging node 312 identifies that wireless device 308 is the intended wireless device, paging node 312 generates the paging message. The paging message can include a network identifier associated with the second network. For example, the network identifier can include a globally unique temporary identifier (GUTI) or a public land mobile network identifier (PLMN-ID) in conjunction with a S-temporary mobile subscriber identifier (S-TMSI). The paging message can be broadcast to a plurality of wireless devices associated with paging node 310 and/or paging node 312, where the plurality of wireless devices includes at least one wireless device associated with the first network operator and at least one wireless device associated with the second network operator. The intended wireless device can receive the paging message, identify that the paging message was intended for the wireless device, and send a paging response to paging node 310 or paging node 312.

After a communication session is established, the wireless device 302, 304, 306, and/or 308 can communicate information over a network using various communication services. These services can include voice and/or data services. For example, mobile voice services, mobile data services, push-to-talk services, internet services, web browsing, email, pictures, picture messaging, video, video messaging, audio, voicemail, music, MP3's, ring tones, stock tickers, new alerts, etc.

The paging message including a network identifier that is different from a paging message in a conventional multiple operator communication network, because a paging message of a multiple operator communication network can include a wireless device paging identifier that can be the same for a wireless device associated with a first network operator and a wireless device associated with a second network operator. For example, when the first network operator and the second network operator have the same controller node information and/or when the S-TMSI is equal for a wireless device associated with the first network operator and a wireless device associated with the second network operator. Therefore, when a paging message in a conventional multiple operator communication networks is sent, both the wireless device associated with the first network operator and the wireless device associated with the second network operator can receive the paging message and initiate re-establishing communications with paging node. Since the paging message in conventional networks is only intended for one wireless device, excess network resources can be consumed while diminishing a user's experience. For example, the wireless device not intended to receive the paging device unnecessarily consumes battery power needed to initiate network connection, the network throughput is effected by an increase in response message transmission needed for both wireless devices to attempt to initiate re-connection, and the network can receive a false paging response from the unintended wireless device causing additional processing and messaging resources.

Figure 4:
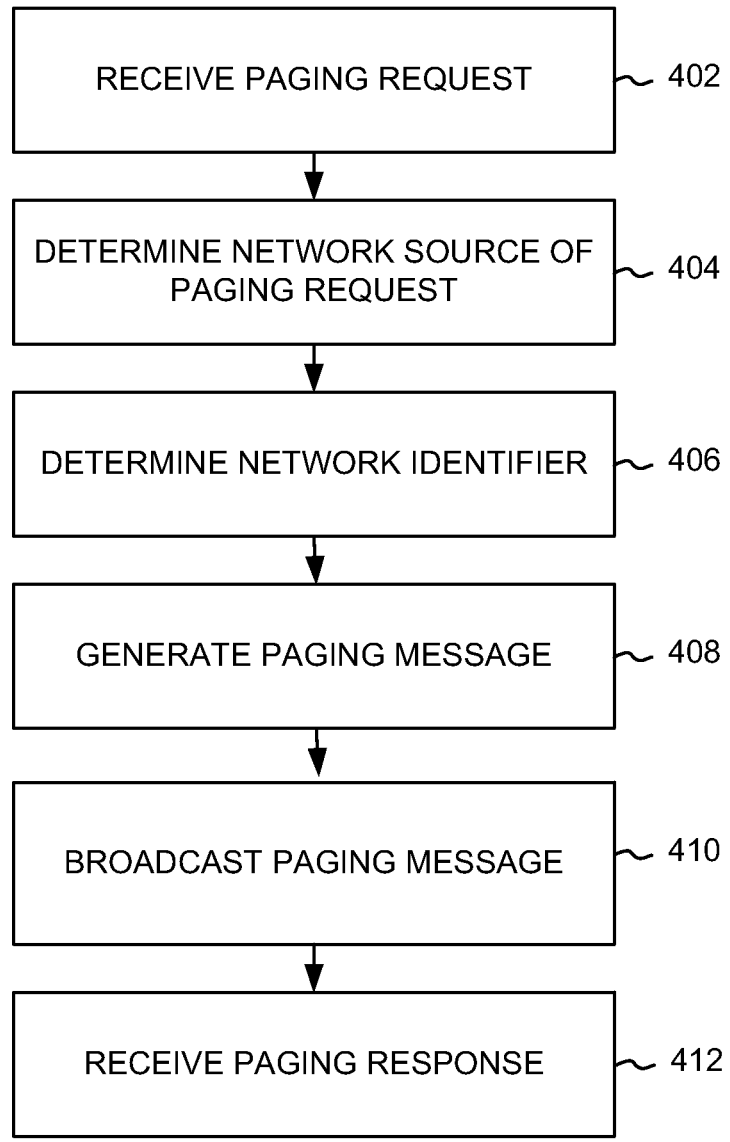
FIG. 4 illustrates another exemplary method of sending paging messages to a wireless device.

FIG. 4 illustrates a flow chart of an exemplary method of sending a paging message in a communication system. The method will be discussed with reference to the exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

A controller node associated with a first network operator 314 can send a paging request for a wireless device associated with the first network operator to a paging node. For example, controller node 314 can generate the paging request message when a wireless device associated with the first network operator 302 or 306 is in an idle state and information is available to be transmitted to the wireless device 302 or 306. The controller node 314 can send to a single paging node. For example, if controller node 314 knows that wireless device 302 is associated with paging node 310 than controller node 314 can decide to only send the paging request message to paging node 310. Alternatively, controller node 314 can send the paging request message to all paging nodes in communication with controller node 314.

Paging node 310 and/or 312 can receive the paging request message at 402. The paging request message can include network information such that paging node 310 and/or 312 can identify the network in which the paging request message originated at 404. This network information can be a network identifier or information that can be used to generate a network identifier. For example, the paging request message can include a GUTI and/or a PLMN-ID and S-TMSI based on the paging request received from controller node 314.

The paging node 310 and/or 312 can determine the network identifier of the received paging request message at 406. For example, paging node 310 and/or 312 can generate the network identifier by determining the network associated with the controller node that sent the paging request message. Alternatively, when the paging request message includes the network identifier, paging node 310 and/or 312 can identify the network identifier within the paging request message.

At 408, paging node 310 and/or 312 can generate a paging message to send to wireless devices. The generated paging message can include a network identifier. For instance, a GUTI and/or a PLMN-ID and S-TMSI can be used as a network identifier. Alternatively, other information can be used as a network identifier such that the paging message can be identified as being associated with one particular network. The paging message can also include any other information used to indicate that a network is attempting to re-establish communications with the intended wireless device.

Paging node 310 and/or 312 can broadcast the paging message at 410. For example, a plurality of wireless devices associated with each paging node can receive the paging message. The plurality of wireless devices can include at least one wireless device associated with the first network operator and at least one wireless device associated with the second network operator such that paging node 310 and/or 312.

In an embodiment when wireless device 302 is the intended wireless device, paging nodes 310 and 312 can receive the paging request from controller node 314. Paging node 310 can generate the paging message and broadcast the paging message to all wireless devices associated with paging node 310, for example wireless devices 302 and 304.

In an embodiment when wireless device 306 is the intended wireless device, paging nodes 310 and 312 can receive the paging request from controller node 314. Paging node 312 can generate the paging message and broadcast the paging message associated with paging node 312, for example, wireless devices 306 and 308.

In an alternative embodiment, both paging nodes can receive the paging request, generate a paging message, and broadcast the paging message to all wireless devices associated with each paging node. For example, paging node 310 can broadcast the paging message to wireless devices 302 and 304 and paging node 312 can broadcast the paging message to wireless devices 306 and 308. The paging message can be the same paging message or a different paging message when it is broadcast from both paging nodes 310 and 312 provided that both messages include the same network identifier.

All wireless devices that receive the paging message can determine whether it is the intended recipient of the paging message and the intended wireless device can send a paging response message. For example, when wireless device 302 is the intended recipient, wireless device 302 can generate a paging response message to send to the paging node 310. When wireless device 306 is the intended recipient, wireless device 306 can generate a paging response message to send to the paging node 312. At 412, paging nodes 310 and/or 312 can receive the paging response message. A communication session can be initiated after the paging response message is received, such that the information available at the network can be transmitted to the intended wireless device.

Controller node 316 and wireless devices 304 and 308 associated with the second network can also send and/or receive paging requests, paging messages, paging responses, etc. via paging nodes 310 and/or 312 in a manner similar to that described above with respect to controller node 314 and wireless devices 302 and 306.

Figure 5:
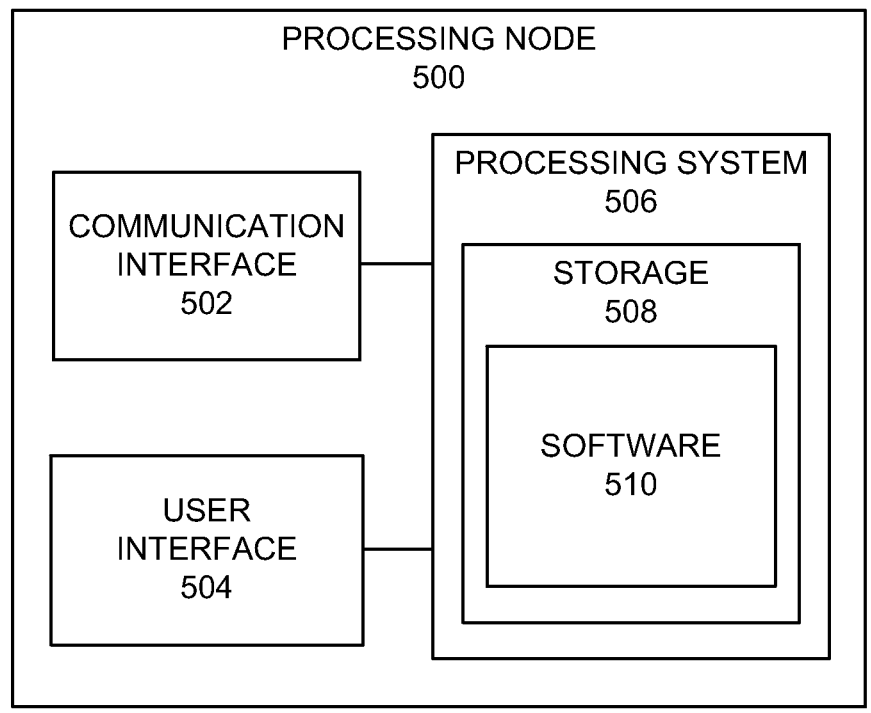
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 is capable of monitoring communications in a communication network. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include paging nodes 106, 310, 312 and controller nodes 108, 110, 314, 316. Processing node 500 can also be an adjunct or component of a network element, such as an element of paging nodes 106, 310, 312 and controller nodes 108, 110, 314, 316. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of paging a wireless device in a communication network, comprising:
receiving, at a paging node in communication with a first network and a second network, a paging request from a controller node of the first network for a first wireless device, wherein the paging request comprises an indication of the first network;
generating, at the paging node, a paging message for the first wireless device based on the paging request, the paging message comprising an identifier of the first network;
broadcasting the paging message to a plurality of wireless devices, the plurality of wireless devices comprising the first wireless device and at least one second wireless device associated with the second network; and
receiving a paging response from the first wireless device based on the paging message.

2. The method of claim 1, wherein receiving, at the paging node in communication with the first network and the second network, the paging request from the controller node of the first network for the first wireless device, wherein the paging request comprises an indication of the first network comprises:
determining a network source of the paging request based on the indication; and
determining a network identifier from the paging request based on the network source.

3. The method of claim 1, wherein the paging message further comprises a first portion associated with the first network and the second network and a second portion associated with only the first network.

4. The method of claim 1, wherein the first network is controlled by a first network operator and the second network is controlled by a second network operator.

5. The method of claim 1, wherein the identifier comprises a globally unique temporary identity (GUTI) message.

6. The method of claim 1, wherein the identifier comprises a public land mobile network (PLMN) message and a temporary mobile subscriber identity (S-TMSI) message.

7. A method of paging a wireless device in a communication network, comprising:
- receiving, at a paging node associated with a first network, a paging request from a controller node associated with a second network for a wireless device associated with the second network, wherein the paging request comprises an indication of the second network;
- determining, at the paging node associated with the first network, a network source of the paging request based on the received indication;
- determining, at the paging node associated with the first network, a network identifier based on the network source;
- generating, at the paging node associated with the first network, a paging message based on the paging request, the paging message further comprising the network identifier based on the network source;
- broadcasting the paging message to a plurality of wireless devices in communication with the paging node associated with the first network, the plurality of wireless devices comprising the wireless device associated with the second network and at least one wireless device associated with the first network; and
- receiving a paging response from the wireless device associated with the second network based on the paging message.

8. The method of claim 7, wherein the paging message further comprises a first portion associated with the first network and the second network and a second portion associated with only the second network.

9. The method of claim 7, wherein the first network is controlled by a first network operator and the second network is controlled by a second network operator.

10. The method of claim 7, wherein the network identifier comprises a globally unique temporary identity (GUTI) message.

11. The method of claim 7, wherein the network identifier comprises a public land mobile network (PLMN) message and a temporary mobile subscriber identity (S-TMSI) message.

12. The method of claim 7 further comprising:
- receiving, at a paging node associated with the second network, a paging request from a controller node associated with the first network for a wireless device associated with the first network, wherein the paging request comprises an indication of the first network;
- determining, at the paging node associated with the second network, a network source of the paging request based on the received indication;
- determining, at the paging node associated with the second network, a network identifier based on the network source;
- generating, at the paging node associated with the second network, a paging message based on the paging request, the paging message further comprising the network identifier based on the network source;
- broadcasting the paging message to a plurality of wireless devices in communication with the paging node associated with the second network, the plurality of wireless devices comprising the wireless device associated with the first network and at least one wireless device associated with the second network; and
- receiving a paging response from the wireless device associated with the first network based on the paging message.

13. A communication system, comprising:
a paging node in communication with a first network and a second network configured to
- receive a paging request from a controller node of the first network for a first wireless device, wherein the paging request comprises an indication of the first network;
- generate a paging message for the first wireless device based on the paging request, the paging message further comprising an identifier of the first network;
- broadcast the paging message to a plurality of wireless devices, the plurality of wireless devices comprising the first wireless device and at least one second wireless device associated with the second network, and
- receive a paging response from the first wireless device based on the paging message.

14. The communication system of claim 13, wherein the paging node is further configured to determine a network source of the paging request and determine a network identifier from the paging request based on the network source.

15. The communication system of claim 13, wherein the paging message further comprises a first portion associated with the first network and the second network and a second portion associated with only the first network.

16. The communication system of claim 13, wherein the first network is controlled by a first network operator and the second network is controlled by a second network operator.

17. The communication system of claim 13, wherein the paging request is indicative of information available at the first network for the first wireless device.

18. The communication system of claim 13, wherein the identifier comprises a globally unique temporary identity (GUTI) message.

19. The communication system of claim 13, wherein the identifier comprises a public land mobile network (PLMN) message and a temporary mobile subscriber identity (S-TMSI) message.

20. The method of claim 6, wherein the paging response is received from the first wireless device based on the identifier comprising the PLMN and the S-TMSI such that a second wireless device associated with the second network comprising the same S-TMSI receives the broadcast and does not transmit a paging response based on a different PLMN.

* * * * *